(12) United States Patent
Allyn

(10) Patent No.: US 11,029,836 B2
(45) Date of Patent: Jun. 8, 2021

(54) CROSS-PLATFORM INTERACTIVITY ARCHITECTURE

(71) Applicant: Microsoft Technology Licensing, LLC., Redmond, WA (US)

(72) Inventor: Barry Christopher Allyn, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 567 days.

(21) Appl. No.: 15/224,389

(22) Filed: Jul. 29, 2016

(65) Prior Publication Data

US 2017/0277381 A1 Sep. 28, 2017

Related U.S. Application Data

(60) Provisional application No. 62/313,378, filed on Mar. 25, 2016.

(51) Int. Cl.
*G06F 3/00* (2006.01)
*G06F 3/0487* (2013.01)
(Continued)

(52) U.S. Cl.
CPC ............ *G06F 3/0487* (2013.01); *G06F 3/017* (2013.01); *G06F 3/033* (2013.01); *G06F 3/038* (2013.01);
(Continued)

(58) Field of Classification Search
CPC .... G06F 3/017; G06F 3/04883; G06F 3/0488; G06F 3/0482; G06F 3/0416;
(Continued)

(56) References Cited

U.S. PATENT DOCUMENTS 5,548,703 A * 8/1996 Berry .................... G06F 3/0481
715/853
5,926,169 A * 7/1999 Church .............. A47B 21/0371
345/156

(Continued)

OTHER PUBLICATIONS

"International Search Report and Written Opinion Issued in PCT Application No. PCT/US2017/023274", dated Jun. 1, 2017, 12 Pages.

(Continued)

*Primary Examiner* — Jennifer E Nichols
(74) *Attorney, Agent, or Firm* — NovoTechIP International PLLC

(57) ABSTRACT

Maintaining an application for deployment across platforms requires significant engineering effort and an expanded code base, especially when dealing with different input types from the host platforms. To reduce the computational expenses and improve the standardization of the user interface, systems and methods are provided to recognize gestures in a platform agnostic code architecture, which may be deployed on multiple platforms with different input and output methodologies to provide a consistent user experience with a smaller code base to install on those platforms and to maintain. Individual platforms may tailor the size of the (Continued)

architecture to meet their deployment needs and the architecture may be updated independently of the client logic of various applications.

18 Claims, 10 Drawing Sheets

(51) Int. Cl.
  *G06F 9/44* (2018.01)
  *G06F 3/01* (2006.01)
  *G06F 3/038* (2013.01)
  *G06F 3/0488* (2013.01)
  *G06F 3/0481* (2013.01)
  *G06F 3/0484* (2013.01)
  *G06F 3/033* (2013.01)
  *G06F 9/54* (2006.01)
  *G06F 3/0482* (2013.01)

(52) U.S. Cl.
  CPC .......... *G06F 3/0481* (2013.01); *G06F 3/0484* (2013.01); *G06F 3/0488* (2013.01); *G06F 9/44* (2013.01); *G06F 3/0482* (2013.01); *G06F 9/542* (2013.01)

(58) Field of Classification Search
  CPC ....... G06F 3/04842; G06F 2203/04808; G06F 2203/04104; G06F 2203/04806; G06F 3/048; G06F 3/0485; G06F 3/0233; G06F 3/0481; G06F 3/0486; G06F 3/0487; G06F 3/0484; G06F 9/44; G06F 3/038; G06F 3/033; G06F 9/542; G06F 8/38; G06F 9/451
  See application file for complete search history.

(56) References Cited

U.S. PATENT DOCUMENTS

| | | | |
|---|---|---|---|
| 6,018,333 A * | 1/2000 | Denber | G06F 3/04842 345/162 |
| 6,335,738 B1 * | 1/2002 | Englefield | G06F 9/453 715/744 |
| 6,470,197 B1 * | 10/2002 | Tuoriniemi | H04M 1/6058 455/575.2 |
| 7,299,304 B2 | 11/2007 | Saint-Hilaire et al. | |
| 7,404,194 B2 | 7/2008 | Wason et al. | |
| 7,788,245 B1 * | 8/2010 | Eddings | G06F 16/951 707/705 |
| 8,638,343 B2 | 1/2014 | Allyn et al. | |
| 8,738,814 B1 * | 5/2014 | Cronin | G06F 3/04883 710/5 |
| 8,745,280 B1 * | 6/2014 | Cronin | G06F 3/0488 710/8 |
| 8,894,489 B2 | 11/2014 | Lim | |
| 9,075,618 B2 | 7/2015 | Winternitz et al. | |
| 9,110,581 B2 | 8/2015 | Momchilov | |
| 9,213,478 B2 | 12/2015 | Kuo | |
| 9,250,926 B2 | 2/2016 | Allyn et al. | |
| 9,652,076 B1 * | 5/2017 | Newcomb | G06F 3/0485 |
| 9,836,885 B1 * | 12/2017 | Eraker | G06F 3/04815 |
| 10,180,728 B2 * | 1/2019 | Cao | G06F 3/0481 |
| 2004/0178995 A1 * | 9/2004 | Sterling | G06F 3/044 345/173 |
| 2005/0088420 A1 * | 4/2005 | Dodge | G06F 3/1263 345/173 |
| 2005/0262452 A1 * | 11/2005 | Sauermann | G06F 3/0482 715/853 |
| 2005/0283728 A1 * | 12/2005 | Pfahlmann | G06F 3/0481 715/711 |
| 2008/0011819 A1 * | 1/2008 | Patil | G06F 11/3672 235/375 |
| 2008/0094370 A1 * | 4/2008 | Ording | H04M 1/72522 345/173 |
| 2009/0066641 A1 | 3/2009 | Mahajan et al. | |
| 2009/0128516 A1 * | 5/2009 | Rimon | G06F 3/04883 345/174 |
| 2009/0225038 A1 * | 9/2009 | Bolsinga | G06F 40/14 345/173 |
| 2009/0284479 A1 * | 11/2009 | Dennis | G06F 3/0482 345/173 |
| 2010/0156789 A1 * | 6/2010 | Aymeric | G06F 3/04847 345/161 |
| 2010/0159823 A1 * | 6/2010 | Smith | H04B 7/155 455/7 |
| 2010/0162152 A1 * | 6/2010 | Allyn | G06F 3/04812 715/767 |
| 2010/0188328 A1 | 7/2010 | Dodge et al. | |
| 2010/0241973 A1 | 9/2010 | Whiddett | |
| 2010/0277507 A1 * | 11/2010 | Allyn | G06T 11/206 345/660 |
| 2011/0169726 A1 * | 7/2011 | Holmdahl | G06K 9/00342 345/156 |
| 2011/0279384 A1 * | 11/2011 | Miller | G06F 3/04886 345/173 |
| 2011/0298724 A1 * | 12/2011 | Ameling | G06F 3/04883 345/173 |
| 2011/0310005 A1 * | 12/2011 | Chen | G06F 1/3262 345/156 |
| 2011/0314093 A1 * | 12/2011 | Sheu | G06F 3/14 709/203 |
| 2012/0056818 A1 | 3/2012 | Shafi et al. | |
| 2012/0092277 A1 * | 4/2012 | Momchilov | G06F 3/038 345/173 |
| 2012/0174029 A1 * | 7/2012 | Bastide | G06F 3/0488 715/800 |
| 2012/0242581 A1 * | 9/2012 | Laubach | G06F 3/0213 345/168 |
| 2012/0260203 A1 * | 10/2012 | Commarford | G06F 3/0486 715/769 |
| 2012/0266079 A1 * | 10/2012 | Lee | G06F 16/27 715/744 |
| 2012/0293421 A1 * | 11/2012 | Santoro | G06F 3/033 345/173 |
| 2013/0038552 A1 * | 2/2013 | Chan | G06F 3/04883 345/173 |
| 2013/0120280 A1 * | 5/2013 | Kukulski | G06F 3/04883 345/173 |
| 2013/0159555 A1 * | 6/2013 | Rosser | G06F 3/038 710/5 |
| 2013/0162519 A1 * | 6/2013 | Ameling | G06F 3/0488 345/156 |
| 2013/0263029 A1 | 10/2013 | Rossi et al. | |
| 2014/0019844 A1 * | 1/2014 | Rakow | G06F 3/0488 715/234 |
| 2014/0026086 A1 * | 1/2014 | Zuverink | G06F 9/451 715/765 |
| 2014/0075372 A1 * | 3/2014 | Wu | G06F 9/451 715/781 |
| 2014/0130090 A1 * | 5/2014 | Krikorian | G06F 3/017 725/37 |
| 2014/0130116 A1 * | 5/2014 | Krikorian | H04N 21/42206 725/139 |
| 2014/0181193 A1 * | 6/2014 | Narasimhan | H04W 4/21 709/204 |
| 2014/0181756 A1 * | 6/2014 | Kuo | G06F 3/0484 715/856 |
| 2014/0282269 A1 * | 9/2014 | Strutt | G06F 3/04886 715/863 |
| 2014/0310335 A1 | 10/2014 | Snibbe et al. | |
| 2014/0361982 A1 * | 12/2014 | Shaffer | G06F 9/541 345/156 |
| 2015/0006172 A1 * | 1/2015 | Alameh | G10L 15/26 704/235 |
| 2015/0022478 A1 * | 1/2015 | Townsend | G06F 9/451 345/173 |
| 2015/0058812 A1 * | 2/2015 | Lindh | G06F 3/012 715/863 |

(56) References Cited

U.S. PATENT DOCUMENTS

| | | | | |
|---|---|---|---|---|
| 2015/0106706 | A1* | 4/2015 | Jeong | G06F 3/04842 715/274 |
| 2015/0242746 | A1* | 8/2015 | Rao | G06N 3/088 706/16 |
| 2016/0062473 | A1* | 3/2016 | Bouchat | G06F 3/017 345/156 |
| 2016/0070424 | A1* | 3/2016 | Furtwangler | G06F 3/0487 715/822 |
| 2016/0070457 | A1* | 3/2016 | Furtwangler | G06F 8/35 715/763 |
| 2016/0077603 | A1* | 3/2016 | Rinfret | G06F 9/452 345/156 |
| 2016/0085430 | A1* | 3/2016 | Moran | G06F 8/76 715/765 |
| 2016/0364321 | A1* | 12/2016 | Nuriel | G06F 11/3684 |
| 2016/0379264 | A1* | 12/2016 | Kolaja | G06Q 20/3224 705/14.64 |
| 2017/0010868 | A1* | 1/2017 | Encontre | G06F 8/30 |
| 2017/0041780 | A1* | 2/2017 | Forsblom | G01D 21/00 |
| 2017/0270142 | A1* | 9/2017 | Shioya | G06K 9/00671 |
| 2017/0277381 | A1* | 9/2017 | Allyn | G06F 3/033 |

OTHER PUBLICATIONS

Grochow, et al., "Client + Cloud: Evaluating Seamless Architectures for Visual Data Analytics in the Ocean Sciences", In Proceedings of the 22nd international conference on Scientific and statistical database management, Jun. 30, 2010, 18 pages.

Fraser, et al., "KOLAM: A cross-platform architecture for scalable visualization and tracking in wide-area imagery", In Proceedings of SPIE Geospatial InfoFusion III, vol. 8747, Jun. 13, 2013, 2 pages.

Halpern, et al., "Mosaic: cross-platform user-interaction record and replay for the fragmented android ecosystem", In IEEE International Symposium on Performance Analysis of Systems and Software, Mar. 29, 2015, pp. 215-224.

Zelenkauskaite, et al., "Big data through cross-platform interest-based interactivity", In Proceedings of International Conference on Big Data and Smart Computing, Jan. 15, 2014, 3 pages.

Grochow, Keith, "The Design of COVE: A Collaborative Ocean Visualization Environment", In Dissertation submitted to University of Washington, Retrieved on: Feb. 19, 2016, 171 pages.

"Advanced gesture recognition technology for mobile devices—Research & Development", Published on: Sep. 18, 2010 Available at: http://www.auriga.com/files/projects/UC_GestureRecognition.pdf.

* cited by examiner

MOBILE COMPUTING DEVICE

US 11,029,836 B2

CROSS-PLATFORM INTERACTIVITY ARCHITECTURE

CROSS-REFERENCE TO RELATED APPLICATIONS

This application claims benefit of U.S. Provisional Patent Application No. 62/313,378 titled "CROSS-PLATFORM INTERACTIVITY ARCHITECTURE" filed on Mar. 25, 2016, the entirety of which is hereby incorporated by reference.

BACKGROUND

Deploying an application on multiple electronic platforms (including multiple operating systems and hardware configurations) often involves deploying multiple versions of that application that are tailored to individual platforms. Of particular importance when deploying an application across multiple platforms is adapting the application to receive inputs differently (according to the various platforms' input models) and still perform actions within the application consistently. By tailoring an application to a platform and its input model, however, the user experience for the application may diverge across different platforms, the amount and complexity of the code that must be maintained for the various platforms is increased, and the storage space required to provide or install the code on a given platform is increased.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein to enable a cross-platform interactivity architecture. By separating the core functionality of the application's architecture from the input functionalities of the platform, the inputs may be normalized across various platforms. Normalizing the inputs enables the interactivity architecture to be consistently used between platforms even though the input methodologies may be unique to those platforms. For example, in a first operating system that selects an object with a double-click of a left mouse button and a second operating system that selects an object with a double-tap of a touchscreen, the application may use the architecture to abstract the different inputs to perform a single action regardless of the platform on which the application is run or installed on.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
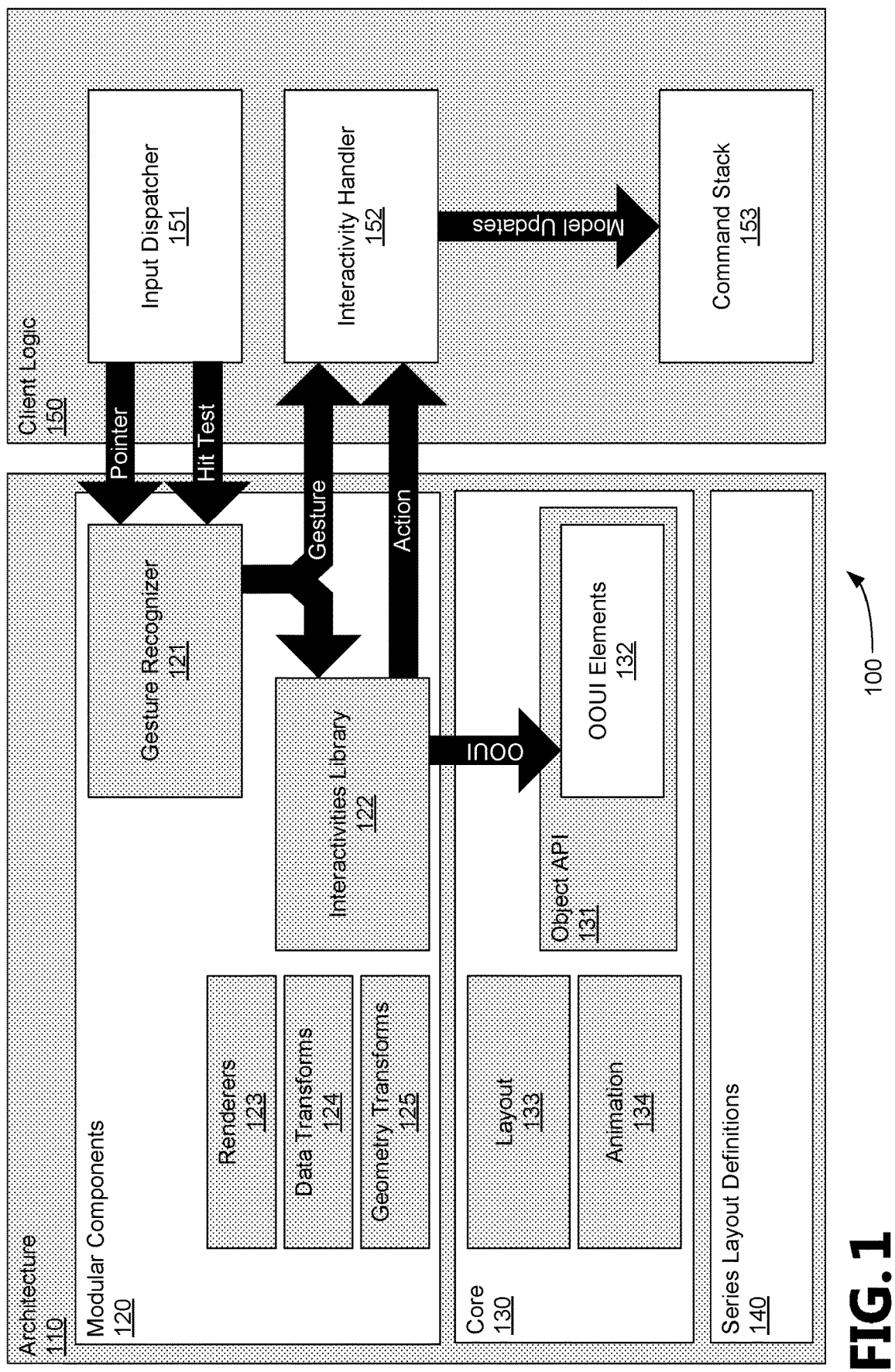
FIG. 1 illustrates an example extensible framework in which a cross-platform interactivity architecture may be implemented.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

FIG. 1 illustrates an example extensible framework 100 in which a cross-platform interactivity architecture 110 may be implemented. As illustrated, the architecture 110 is implemented independently from client logic 150 so that multiple platforms or applications (collectively "clients"), having distinct logic sets, may draw upon the same architecture 110 or customized subsets thereof. For example, a client running with the Android™ operating system (available from Alphabet, Inc. of Mountain View, Calif.) on a smartphone may have distinct client logic 150 for how a user may request to zoom a display compared to the client logic 150 of a Mac OS® operating system (available from Apple, Inc. of Cupertino, Calif.) running on a desktop, but both clients can rely on the same architecture 110 to execute that zoom function.

By relying on a single architecture 110, instead of tailoring an application to a platform, a single user experience and application behavior can be provided regardless of the input methodology of the platform, the amount and complexity of the code that must be maintained for the various platforms is reduced, and the storage space required to provide or install the code is reduced. Clients may further reduce the amount of code supplied for individual applications by removing optional portions of the architecture 110. The client integrates the architecture 110 by streaming client-specific input from an input dispatcher 151 to the architecture 110, and having the architecture 110 transmit its outputs to an interactivity handler 152. The interactivity handler 152 triggers client-specific commands and user feedback elements and delegates tasks to appropriate portions of the architecture 110 or the client logic 150 based on the outputs from the architecture 110. In various aspects, the architecture outputs comprise an interactivity that is client-agnostic or a stack of interactivities that may be treated as a single activity by the interactivity handler 152.

As illustrated, the architecture 110 is divided conceptually into three sections: modular components 120, a core 130, and series layout definitions 140. The modular components 120 include aspects of the architecture that may be turned off or not included in a given deployment to reduce the size and the complexity of the code for the client. For example, a smartphone or tablet may run a reduced-size and functionality version of the Numbers® spreadsheet program (available from Apple, Inc. of Cupertino, Calif.) compared to a laptop or desktop, which is reduced in its size and functionality by not including some of the modular components 120 or portions of at least some of the modular components 120.

The modular components 120 include: renderers 123, operable to convert data into images (still or moving) for display in a user interface; data transforms 124, operable to manipulate the format of data (e.g., translating matrices, converting data in one format to a new format, rephrasing data within a format); and geometry transforms 125, operable to manipulate the display of an image (e.g., rotate, scale, skew, translate, map to a second image such as in augmented reality or 3D texturing). In various aspects, when a modular component 120 is disabled or not included in the architecture 110, the client may instead rely on an equivalent in the client logic 150, or the feature will not be provided to the user. For example, the architecture 110 may provide multiple renderers 123 that provide enhanced rendering in different situations (e.g., a two-dimensional renderer and a three-dimensional renderer), but the client selects less than all of the offered renderers 123 and will either not be able to render according to the omitted renderers 123 or will use a substitute renderer (not illustrated) present in the client logic 150.

The modular components 120 are also illustrated as including the gesture recognizer 121, operable to determine, based on pointer input, the actions being taken by a user, and the interactivities library 122, which holds various interactivities. Although the gesture recognizer 121 and the interactivities library 122 are illustrated as modular components 120, at least a portion of their functionalities are required as parts of the architecture 110 described herein. However, various functionalities of these components may be added by clients or disabled by clients to meet their specific needs or further reduce the size of the code needed to be deployed on a given platform.

The core 130 includes functionalities that may be used with various applications for the layout of objects in the client. For example, layouts 133, operable to define how data series are to be grouped and rendered as geometry in the client (e.g., lines, circles, wedges, boxes), animations 134, operable to tween different geometries shown in the client (e.g., morph or cross-fade a first shape into a second shape), and an object API 131, operable to translate inputs to manage objects in the client are included in the core 130.

The series layout definitions 140 define various groupings of data for consideration as a data series. For example, a series may be defined as a group of values in one category, in two categories (e.g., a 2D coordinate series), in three categories (e.g., a 3D coordinate series), etc., and the format of those data in the categories may also be defined (e.g., positive numbers, text and numbers, numbers from zero to 360). In various aspects, the client may define new series layout definitions 140, which may be added to the architecture 110, or may specify that various series layout definitions 140 may be excluded from the architecture 110.

The client logic 150, as illustrated, is also divided conceptually into three sections: an input dispatcher 151, operable to sends client inputs to the architecture 110, an interactivity handler 152, operable to receive outputs from the architecture 110, and a command stack 153, by which the client logic 150 executes its functionalities.

The input dispatcher 151 takes raw platform-specific touch, mouse, and Natural User Input (NUI) (e.g., from a motion sensing apparatus or controller tracking apparatus) messages (collectively, "pointer input") and directly forwards them, as well as the results of hit testing for objects in the user interface (UI) associated with those pointer inputs, to the gesture recognizer 121 in a format understandable to the architecture 110. As will be appreciated, the term "UI," as used herein, includes an area in which a user may interact with objects that correspond to visualization of data, which may include a digital canvas or other authoring environment. The hit testing of the objects also identifies interactive hotspots (e.g., buttons, grippies, data points, outlines, snap-to locations) associated with the object, which are transmitted as part of the hit test. In various aspects, the input dispatcher 151 may be implemented in thin code that is specific to the platform or application running the client logic 150.

The gesture recognizer 121 converts the raw pointer input into recognized abstract gestures, such as, for example: hover, tap, drag, pinch, etc. Gestures are associated with specific elements in the user interface corresponding to the result of hit testing performed by the input dispatcher 151. For example, when raw pointer input indicates that the user is hovering over a data series represented by a column in a bar chart, that column may be associated with various interactivities, such as displaying a tool tip for changing the color of the column, displaying a grippy for manipulating the size of the column, etc. Similarly, when a second raw pointer input indicates that the user is attempting to drag that column, additional interactivities will be associated with that gesture, such as, displaying a drop zone for dragging the data series to, displaying a new or different chart as including the data series, growing the displayed size of the data series's column, etc.

As will be appreciated, different platforms that user gesture inputs often use different gestures for executing the same command, which the gesture recognizer 121 is operable to normalize. For example, a user of an iPad® or iPhone® computing device (both available from Apple, Inc. of Cupertino, Calif.) may use an inward "pinching" of two fingers on a multi-touch touch screen as a gesture to signify a command (e.g., zoom out, select) that a user on an Android™ computing device or a Windows Phone® mobile computing device (available from Microsoft Corp., of Redmond, Wash.) may use for a different command (e.g., zoom in, close selection). The gesture recognizer 121 therefore will recognize the gesture from the raw pointer input (two inputs on a touchscreen approaching each other in a "pinch") and will determine, based on the platform, what command has been signaled to the architecture 110. Gestures have various target areas in which they apply (e.g., the visualization of a data series in a chart, the chart, labels for an object) and some require various pointer states (e.g., pushed, not pushed), and the lifetime of the gesture is conditioned on maintaining input within that target area and the pointer state (if applicable). For example, various pointer states include, but are not limited to: a mouse click (right, left, middle, etc.), a mouse double-click, a user holding down a mouse button (a continuous depression), a tap of a touchscreen, a double-tap of a touchscreen, a multi-touch input to a touchscreen, a user holding down on a touch screen (a continuous touch), an eye tracking gesture, a pen gesture, a hover gesture, a touchpad gesture, etc.

In various aspects, the gesture recognizer 121 may determine the client's input mode contextually, based on the raw pointer inputs and the potential interactivities of an object matching a hit test, or explicitly, during setup or transmission of the raw pointer inputs. When the input mode is explicitly identified, the gesture recognizer 121 may be told, via the input dispatcher 151, a type of input device (e.g., touch screen, mouse, variable pressure touch screen) and platform (e.g., Android™, MacOS®, Windows Phone®), so that the raw pointer inputs and hit test results will take into account platform-specific gestures from the client logic 150 (e.g., a "flick" on a touch screen to scroll a document's contents with animated "inertia" vs. rolling a mouse scroll wheel to scroll a document's contents) and the precision of the input device. When the input mode is contextually identified, the potential target objects from hit testing will affect the determination of the gesture. For example, when several objects in a UI are potential matches for a hit test, the gesture recognizer 121 may select the first object that is a potential target and apply the inputs relative to that target (e.g., a drag command may intersect several objects in a UI, and the first object matching a hit test is considered to be the target to drag to a new location) or a subsequent object may be selected as the target based on the raw pointer inputs and recognized potential commands (e.g., a first object of a data point in a chart may be discarded as a target object in favor of the display area of the chart when a user is recognized as attempting to "zoom" the display area of the chart).

Clients can use the gesture recognizer 121 independently to build interactivities that are independent of UI elements, such that they can be used between multiple UI elements (e.g., drag a data point from a chart to create a new chart, drag a data series into an existing chart, drag a component from a first drawing into a second drawing, display a drop zone for an object on a canvas) or interactivities that fall within a single UI element (e.g., display a tool tip, display alt text, highlight the selection). The number and the types of the gestures that the gesture recognizer 121 may select from in identifying gestures may vary in different aspects so that the size of the code needed to be deployed may be reduced when certain gestures are not possible or likely on a given platform. For example, multi-touch gestures may be removed from the gesture recognizer 121 on a first device (e.g., a desktop computer), but included on a second device (e.g., a tablet computer) based on the expected input capabilities of those devices and client needs. The recognized gestures are transmitted from the gesture recognizer 121 to the interactivities library 122 and the interactivity handler 152.

A benefit of sharing the gesture recognizer 121 from the architecture 110, rather than leaving it to the client logic 150, is the enforcement of gestures in accordance with one visual style across multiple clients. The interactivities included in the architecture 110 will privately use the gesture recognizer 121, processing gestures rather than raw input to drive their scenarios (e.g., drag a chart title, tap a pivot chart button, hover to highlight a data point). The gesture recognizer 121 can also be used externally, by the client logic 150, to trigger interactivities that only the client logic 150 can implement (e.g., tap a label to invoke a hyperlink, drag a data point to create a new chart, drag one chart onto another to create a small multiples chart or combo chart).

Interactivities that are exposed to the client are stored in the interactivities library 122. Each interactivity processes gestures, provides on-object user interface (OOUI) feedback (as appropriate), and notifies the client when a specific action should be taken. The interactivity library 122 stores several interactivities that are defined by the architecture 110, but may also include customized interactivities defined by the client. Interactivities may invoke accessibility options (e.g., text-to-speech, high contrast mode, large-size font/handle options) when accessibility options are enabled and are not provide natively by the client, such that, for example, a verbalization (via a speaker) of a data tooltip may be provided along with an interactivity stack related to a user hovering a pointer of an object in the UI.

Interactivities are components that may be removed from the architecture 110 as needed based on specific client needs, which provides the benefit that a client may run a stripped-down interactivity library 122 to conserve system memory and storage space. The other benefit is 'provable extensibility' for the interactivities library 122, such that interactivities may be configured so that they can only interact with an object via a public API, and therefore can be built externally for greater reliability for customized interactivities.

In various aspects, interactivities are designed to be lightweight immutable objects that cannot be repurposed across objects or object elements. This means they are pointed at a specific object during creation and are not allowed to change thereafter. For example, a play axis UI cannot be shared across multiple charts—it must be specific to a single chart for its entire lifetime. This pattern avoids API complexity (no set/get methods required for every 'target' property) and simplifies internal logic by foregoing transitioning logic (e.g., teardown/rebuild OOUI, rebind internal state to a different chart context). In other aspects, the interactivities may be mutable and can be called by multiple objects or by one object in various states, which trades API complexity for speed of execution, allowing the system to repurpose existing objects when properties change, rather than creating and deleting immutable objects for each change to that object. One of ordinary skill in the art will appreciate the benefits and drawbacks associated with mutability for objects, and will tailor the interactivities accordingly.

Each interactivity interface exposes aspects to a client-implemented interactivity handler 152 to perform actions specific to the interactivity. This behavioral aspect of inter-activities gives complex clients the opportunity to invoke their own undoable commands, and simple clients to take an appropriate default action that is otherwise unknown to them (but known to the architecture 110). By allowing clients to drive the changes, other scenarios become possible as well, such as, for example animation and live feedback while dragging.

Individual interactivities handle very specific operations and therefore need to be combined with other interactivities to build a rich user experience. To facilitate this, the interactivities library 122 may expose the actions as an interactivity stack that allows interactivities to be pushed and popped based the current UI mode or selection in the client. The stack itself acts as an interactivity so that the client logic 150 only needs to deal with a single interactivity when passing pointer input. This provides the benefit of rich user interactivity combined with enforced code isolation, and allows the client to decide which interactivities to expose to users.

Actions are transmitted from the interactivities library 122 to the interactivity handler 152 to perform the action requested from the interactivity in the client. When called, the interactivity handler 152 will either invoke a client-specific command, which will be added to the command stack 153 via a model update, or delegate the command back to the interactivity library 122 to perform the command on the OOUI elements 132 via the object API 131. Interactivities that provide visual feedback may provide such visual feedback through the OOUI elements 132 that are blended into the object's layout, thereby automatically rendering and animating the OOUI elements 132 with the rest of the object as the interactivity is performed.

Some interactivities provide visual feedback in the form of OOUI elements 132, so that clients do not need to write additional code to enable OOUI feedback—the act of instantiating an interactivity and passing it pointer input will automatically create and display OOUI elements 132 when the interactivity calls for them, although other interactivities may provide visual feedback via manipulation of style properties of objects (e.g., brightening/darkening a color to show a highlighting interactivity). When used to provide visual feedback as part of an interactivity, OOUI elements 132 are automatically placed at the top of the z-order relative to 'normal' object content, and do not influence the layout of other object elements, which ensures that updates to OOUI elements 132 will not trigger a computationally expensive object (re)layout, and thus visual feedback is always responsive, only requiring the given object to be re-rendered (and at a guaranteed bounded cost). For example, when OOUI elements 132 are modified, a 'ContentChanged' notification is sent to trigger rendering via the client's pre-established view update mechanism, but a 'LayoutChanged' notification that schedules object layout is not sent. Each interactivity exposes its OOUI as a tree of elements under a single root. The root is available to the client logic 150 so it can potentially lift the OOUI into a separate compositor layer (e.g. for animation), show/hide the OOUI, or customize the styling of all feedback in a single step. OOUI elements 132 inherit the rendering properties of their immediate parent, similar to how some chart elements inherit from their object model parent (e.g. legend entries inherit from series). The layout of OOUI elements 132 is based on the layout of other object elements, for example, a callout is placed relative to the data point it references (and the data point is not placed relative to the callout). In the interest of improved performance, the update of OOUI elements 132 occurs after all object API 131 calls have been completed and before rendering the changes. To do this, the client explicitly calls a view update command at the correct location in its view update logic. Each interactivity implementation that has OOUI elements 132 will implement this method as appropriate to ensure the OOUI layout is anchored properly within the object.

The architecture 110 and the client logic 150 may be implemented on a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. The hardware of these computing systems is discussed in greater detail in regard to FIGS. 4, 5A, 5B, and 6.

In various aspects, architecture 110 is implemented on a different computing device than the client logic 150 and the two devices are communicated together via a network, such as the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). Data are transferred between the architecture 110 and the client logic 150 over the network for sharing specified actions and interactivities as well as other communications.

Figure 2:
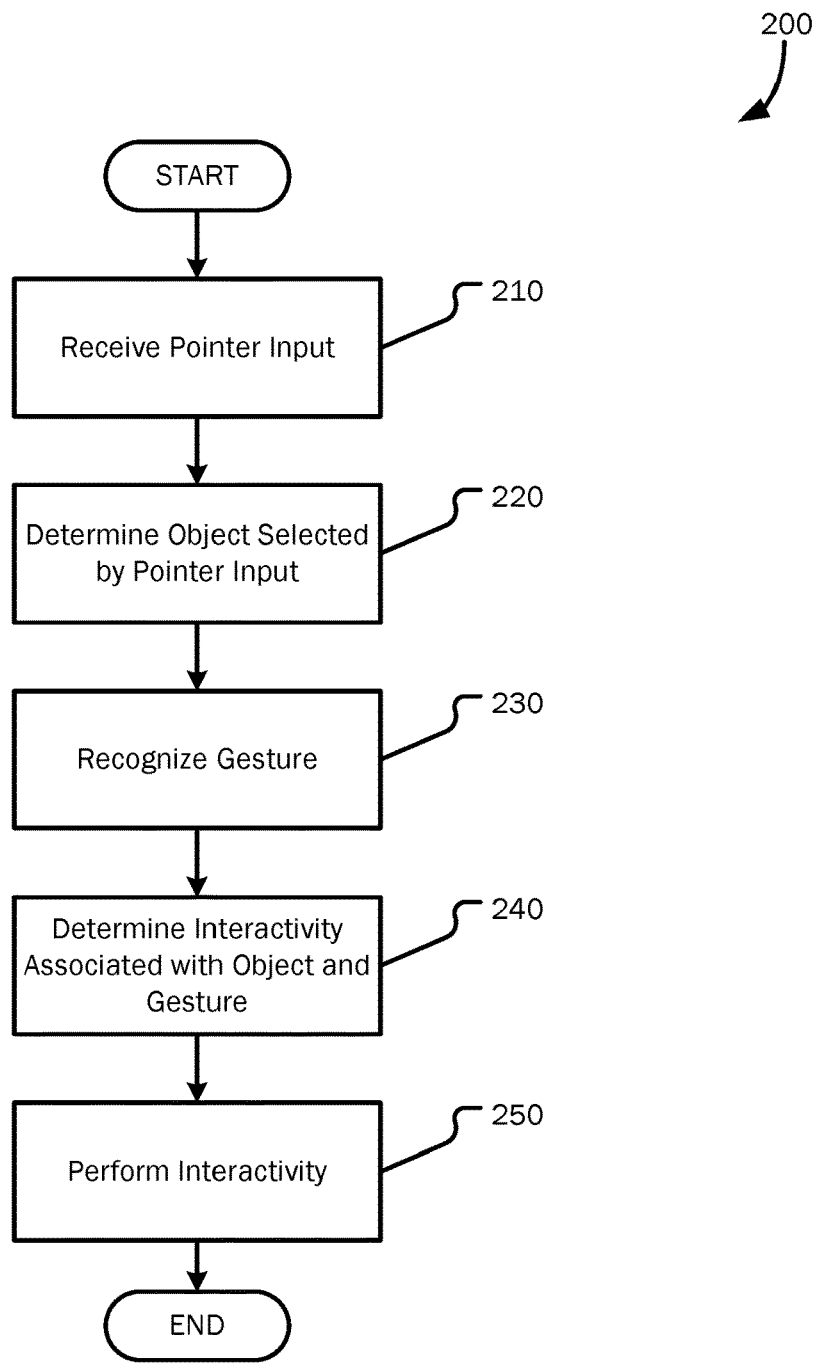
FIG. 2 is a flow chart showing general stages involved in an example method for a uniformly processing inputs from various platforms.

FIG. 2 is a flow chart showing general stages involved in an example method 200 for uniformly processing inputs from various platforms. As will be appreciated, method 200 makes use of the extensible framework 100 described in regard to FIG. 1 to enable a consistent user experience when using various clients when a user interacts with visualized data in those clients. Method 200 begins at OPERATION 210, where pointer input is received from the client by the architecture 110. As will be appreciated, the receiving of raw pointer inputs may be a continuous feed from the client (e.g., showing where a cursor is located on a screen relative to an application having focus) or may be isolated signals (e.g., signals are sent only when a user is making contact with a touch screen, the architecture polls the client for pointer input on a scheduled basis) and includes a loss of input indication (e.g., a user releases an actuated button, a user removes a finger or stylus from a touch screen).

Proceeding to OPERATION 220, it is determined what object has been selected by the raw pointer input from the UI. In various aspects, the client performs hit testing and transmits the one or more objects that have been "hit" by the raw pointer input according to the client. As will be appreciated, several objects may be "hit" by a pointer input (e.g., objects sharing the same or similar X and Y coordinates in different layers, objects sharing a border that is selected, selections of areas in which multiple objects completely or partially reside, proximity detection for inexact "hits"). As will be appreciated, the workspace (e.g., a canvas, a desktop) may be the object of a "hit" so that a selection, zoom or other area-of-effect command may be initiated. In some aspects, clients will push or pop interactivities onto an interactivity stack based on a current mode of the client (e.g., edit mode, consumption mode, exploration mode, preview mode) and the objects selected, and each interactivity is given a chance to use the pointer input (or pass it to the next interactivity in the stack), and the gesture recognizer 121 is used to watch when gestures occur over target objects to trigger interactivities associated with those objects. In alternative aspects, as the user continues to supply pointer inputs (e.g., the user moves a mouse cursor, drags fingers over a touch screen, applies a second finger to a touch screen, actuates a mouse button while over an object), the gesture recognizer 121 will determine from the course of inputs that an initially selected object is to be substituted from a second object. For example, when an initial hit test selects a column from a bar chart as the "hit" initially, but the user performs a gesture that is more frequently associated with the chart as a whole (or not associated with the column), such as, for example, a zooming gesture, the chart will be re-selected as the "hit" based on the increased amount of input related to the gesture.

At OPERATION 230, the gesture is recognized from the raw pointer input and the "hits" for objects related to the raw pointer input. As will be appreciated, a gesture involves a series of pointer inputs collected over a period of time, and what may appear to the user as a single input may, in fact, comprise multiple inputs. For example, when a user touches a touch screen or actuates a mouse button, due to the speed at which raw pointer inputs are collected, the single tap or click actually comprises a series of inputs. Depending on the platform, the gesture recognizer 121 may wait for additional pointer inputs for a preset period before determining the identity of a gesture (for example, waiting to determine whether a user is hovering over an object or moving a cursor over that object). Alternatively, when one gesture leads into another (e.g., a single click or tap leading into a double click or tap) each gesture will be determined separately, and the client will determine which gesture to promote or to ignore. Additionally, location information may be compared against a threshold before determining the identity of a gesture (for example, to distinguish a user jostling a mouse or unevenly applying pressure to a touch screen during a click/tap gesture from beginning to move a pointer or finger for a drag gesture). In various aspects, the thresholds for time and location variability for gesture determination are set via system setting that are transmitted to the architecture 110 during setup (and may be changed subsequently by users), and may account for the polling rate and clock cycle time of the input device and system as well as the precision of the input device (e.g., screen size, dots per inch (DPI) of a mouse, sensitivity of a touchscreen).

At OPERATION 240, the interactivity associated with the "hit" object and the gesture is determined. In various aspects, the interactivity is selected based on the pair of the object and the gesture, while in other aspects, previously selected interactivities may also be used to determine the currently selected interactivity to build a rich user experience. For example, an interactivity may be to show a drop zone when a chart data series visualization is selected as the object and the gesture is interpreted to be a "drag" action, so that a "shadow" of the object is shown in the UI as the user drags the object. Similarly, when the user is dragging an object with a drop zone interactivity and moves near a spot where the client believes would be an acceptable location to insert the data series visualization, a flashing interactivity may be determined based on the selected object, the recognized gesture, and the current interactivity. As will be appreciated, several interactivities may be selected in succession to build an interactivity stack, which may be handled as a single element by the client or as a series of elements by the client to be performed in succession.

Method 200 then proceeds to OPERATION 250, where the interactivity is performed. An interactivity may be passed to the client, for performance in the client's command stack 153 as a single undoable operation, or may be handled in the object API 131 of the architecture 110 as a transient operation. For example, when an interactivity displays a drop zone, that drop zone is illustrated on top of any other elements in the UI without performing a re-layout of the UI. The actions that comprise the interactivity are executed separately from the other user actions so that the interactivities do not interfere with the chain of past operations that a user may perform "undo" commands on; the interactivities may be transient operations. Alternatively, an interactivities stack may take several actions, (e.g., an object is moved from a first location to a second location and a shadow is displayed and the object is highlighted as it is moved) that may be undone as a single operation (e.g., the object would be moved back to the first location from the second location, without showing the object being dragged in a highlighted state or with a shadow).

When a gesture is cancelled or not fully completed, such as, for example, when the gesture recognizer 121 determines that a user moved a pointer away from an object (cancelling a hover) or that a drag never reached a new drop location, the changes made to the UI are undone and the UI restored to its previous state. For example, a tooltip displayed over an object for a hover interactivity is removed when the user moves the pointer or the drop zone "shadow object" drawn on a chart as the user drags a visualization of a data series over a chart is deleted if the user releases the drag gesture at a location within the bounds of the original location or within the bounds of a location to which the data series visualization cannot be moved in the chart.

Method 200 then concludes.

FIGS. 3A-D illustrate examples of interactivities within a UI. As will be appreciated, these illustrations are non-limiting examples of how an interactivity may appear in a UI, and the interactivities may also include animations or colors that are not shown in the figures and in interaction with objects other than and in addition to the charts and chart elements shown in the figures.

Figure 3A:
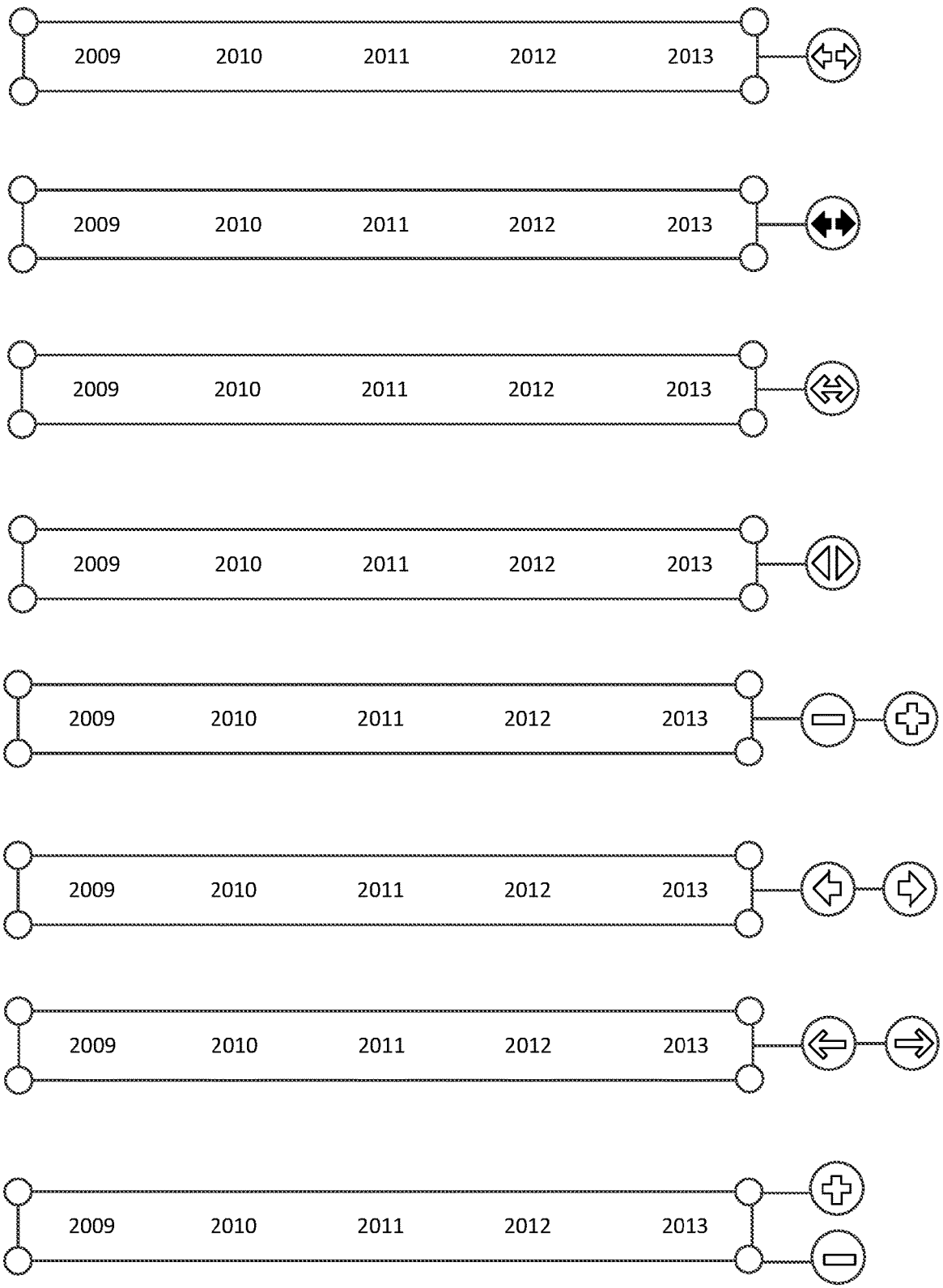
FIGS. 3A-D illustrate examples of interactivities within a UI.

FIG. 3A illustrates examples of handles and grippies, which may appear as part of an interactivity and be the object of future interactivities once selected. The handles and grippies are operable to provide a user an object in the UI to interact with to move, rotate, reselect, or resize an associated object. Depending on the UI theme and the shape of the object or regions of objects selected, the number, shape, and appearance of handles and grippies may vary. For example, a rectangular object or region may have four handles—one at each vertex, but a pentagonal object may have five handles—one at each vertex. In another example, a grippy may be provided to affect the properties of a selected object or region of objects, for example via increase/decrease controls that a user may actuate to apply frequent actions to the object or region. Frequent actions may include, but are not limited to: select a next/previous object in a series of layered object, increase/decrease a font size, cycle colors of an object, shrink/grow an object in a given direction or plane, move an object in a given direction, zoom in/out of a given region, etc.

Figure 3B:
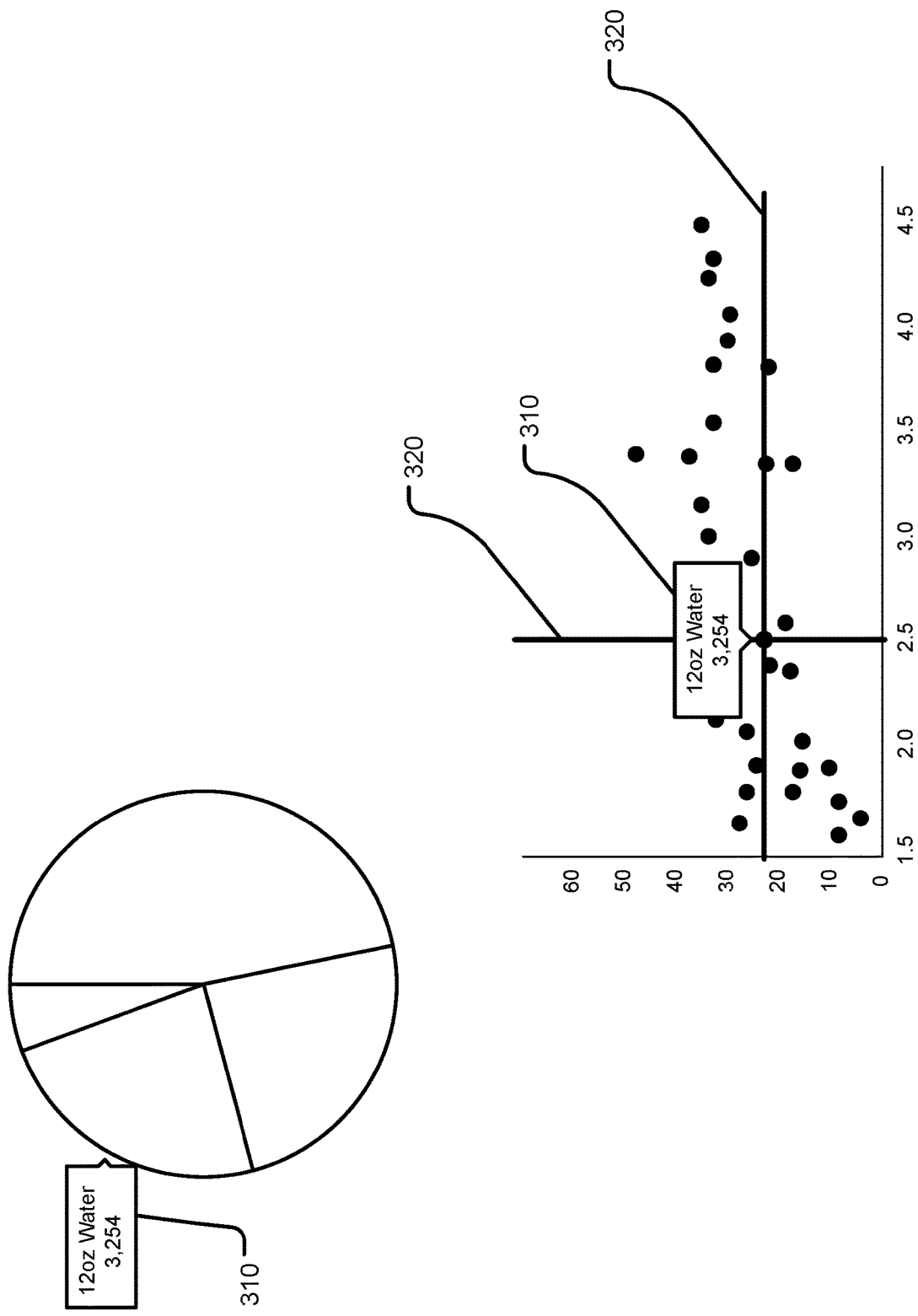

FIG. 3B illustrates examples of callouts 310 and dynamic gridlines 320. As illustrated, callouts 310 are displayed in relation a data series or data point of a pie chart and a scatter plot. The callouts 310 and the dynamic gridlines 320 provide the user with additional data on the data series or data point, and the dynamic gridlines 320 provide visual guidance as to where a user has selected. These interactivities, may be driven off of hover actions or selection actions (e.g., tap, click, double-click)) that hit one or more objects in the UI. The interactivities may cause a tooltip to be provided, a geometry transform to emphasis existing grid lines, or geometry to be created to show the callouts 310 or dynamic gridlines 320 based on an object hit by a pointer in the UI.

Figure 3C:
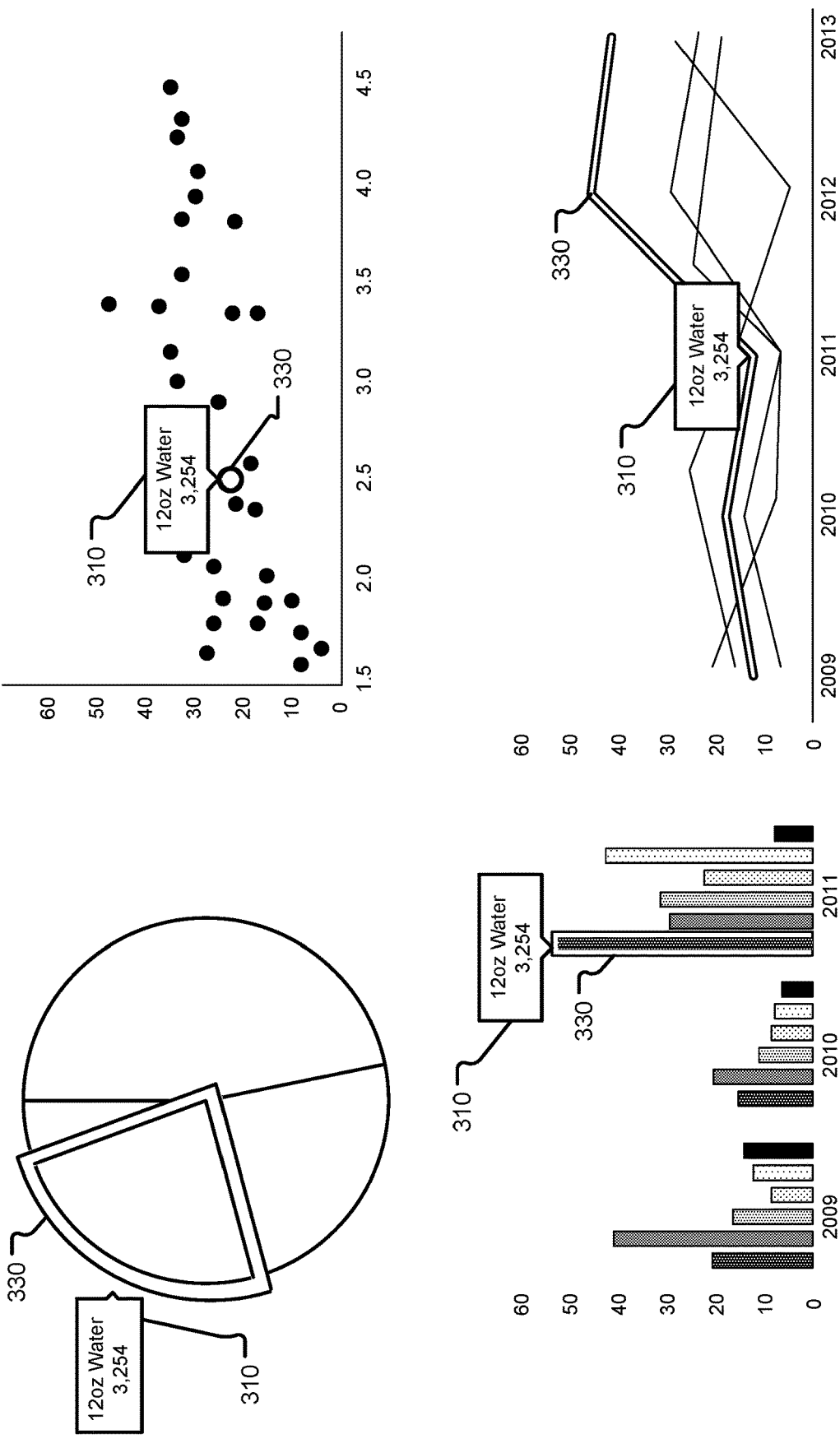

FIG. 3C illustrates examples of selection highlights 330, which provide visual guidance as to where a user has selected. Selection highlights 330 are illustrated in relation to data series and data points in pie charts, scatter plots, bar charts, and line charts. An interactivity for providing a selection highlight 330 performs a geometry transform on the selected object (emphasizing the selected object) or on the un-selected objects (deemphasizing the objects that were not selected). These interactivities, may be driven off of hover actions or selection actions (e.g., tap, click, double-click)) that hit one or more objects in the UI.

Figure 3D:
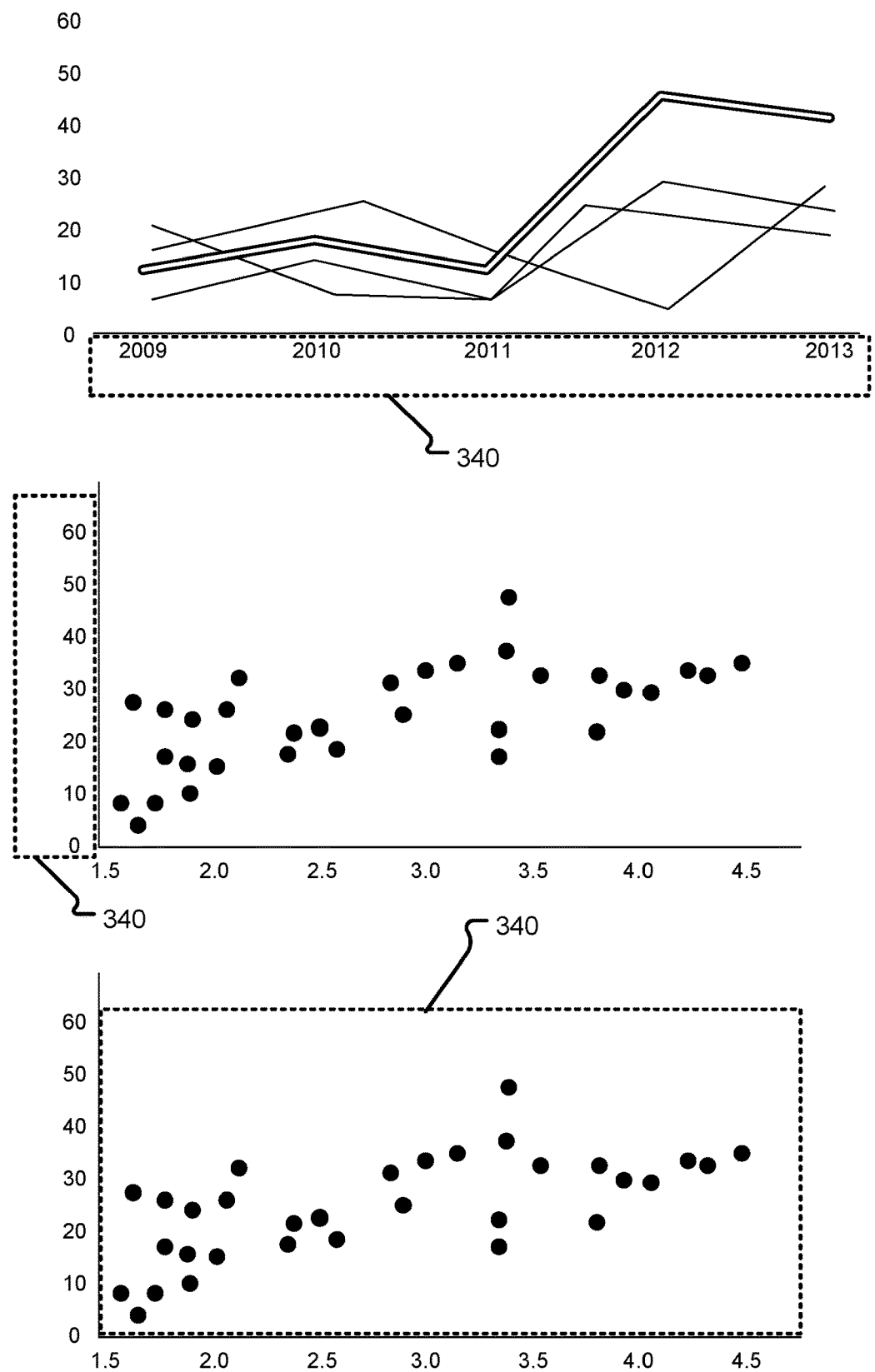

FIG. 3D illustrates examples of highlighted drop zones 340 into which a user may drop a selected object or data series. As illustrated, a dashed line surrounds the highlighted drop zones 340, but other highlighting or demarcation may be used in different aspects. Highlighted drop zones 340 are provided as an option to guide a user's actions in the UI and interactivities that provide for the highlighting of drops zones are implemented by pre-calculating object layouts for several positioning options for sub-objects (e.g., left bottom/center/top; top left/center/right; right bottom/center/top; bottom left/center/right) and showing the highlighted drop zone 340 as a target of a drag or move gesture so that the drop zones will be rendered while the target object is being moved. In various aspects, to reduce processor load and increase system responsiveness, only the closest n drop zones to the object during its movement are shown or an approximation of a drop zone is displayed as the highlighted drop zone 340 for a movement.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
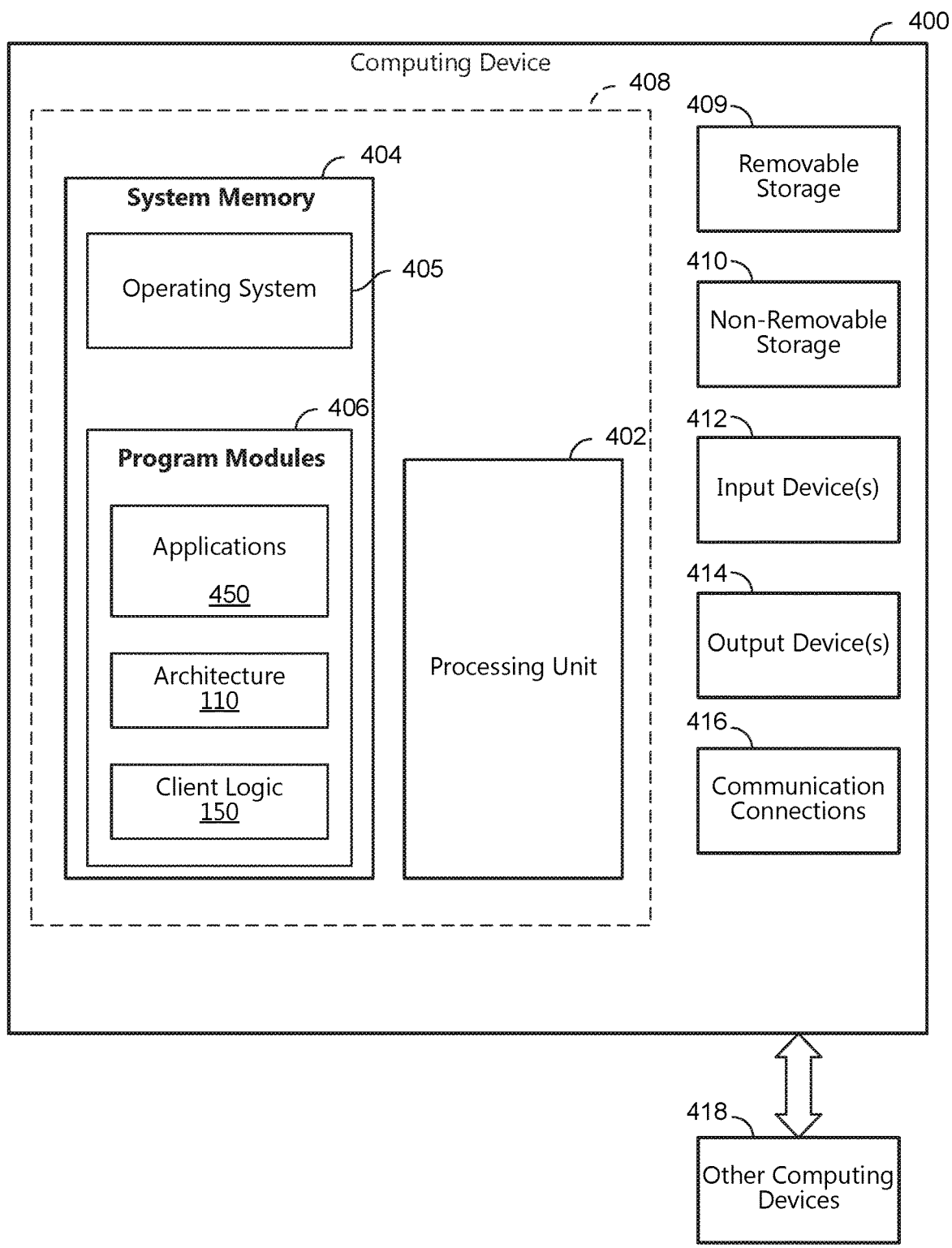
FIG. 4 is a block diagram illustrating physical components of a computing device with which examples may be practiced.
Figure 5A:
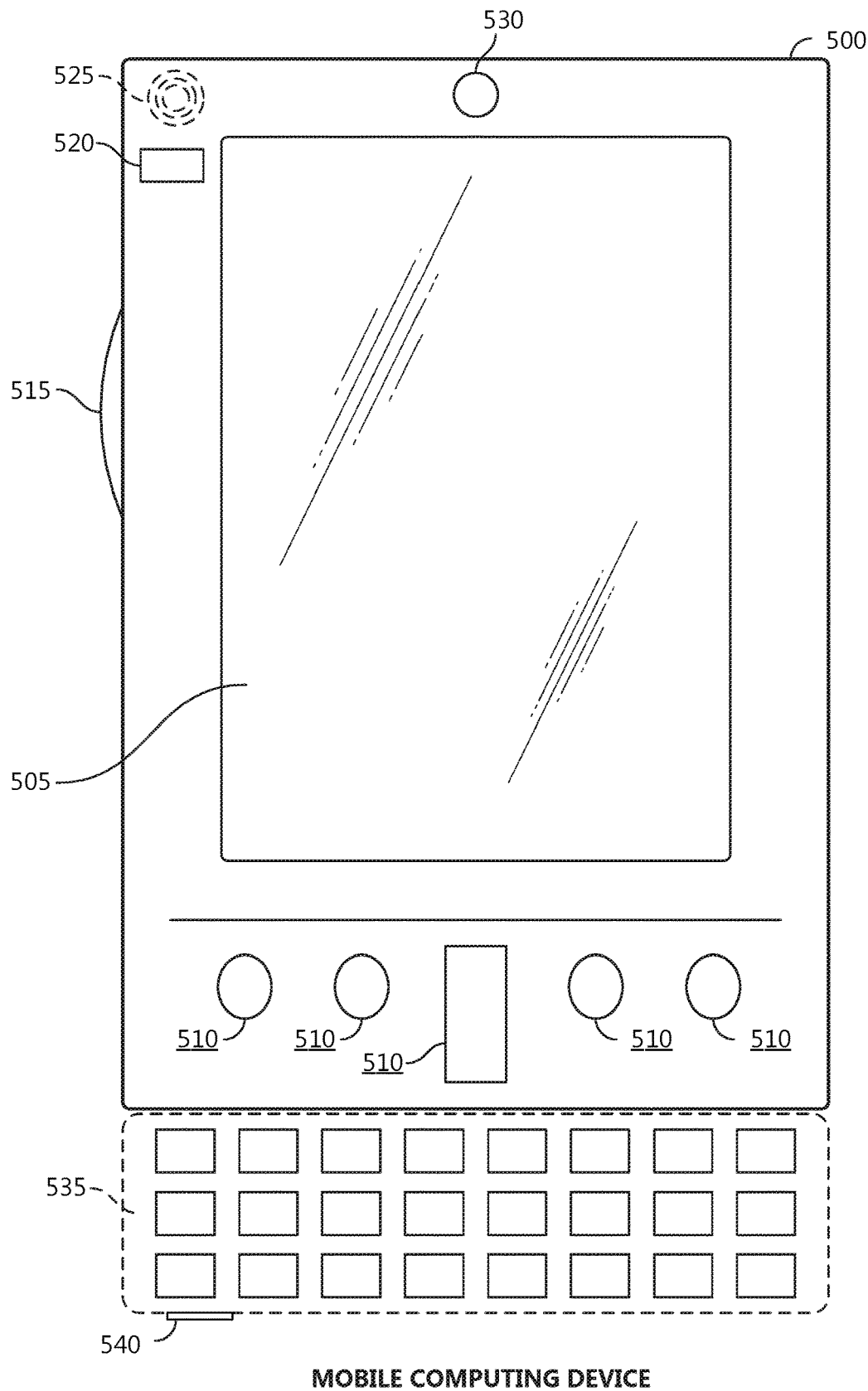
FIGS. 5A and 5B are block diagrams of a mobile computing device with which aspects may be practiced.
Figure 5B:
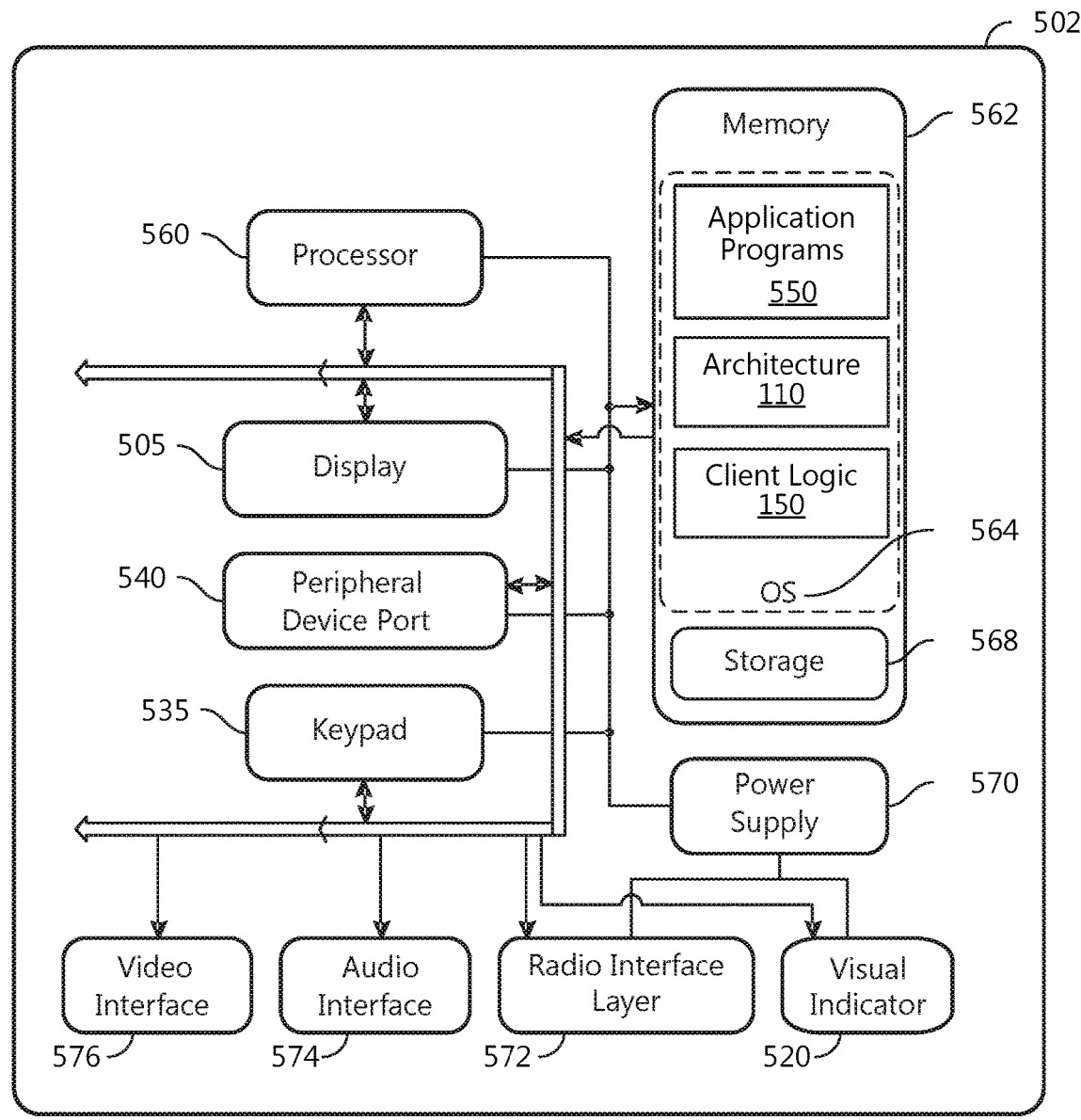
Figure 6:
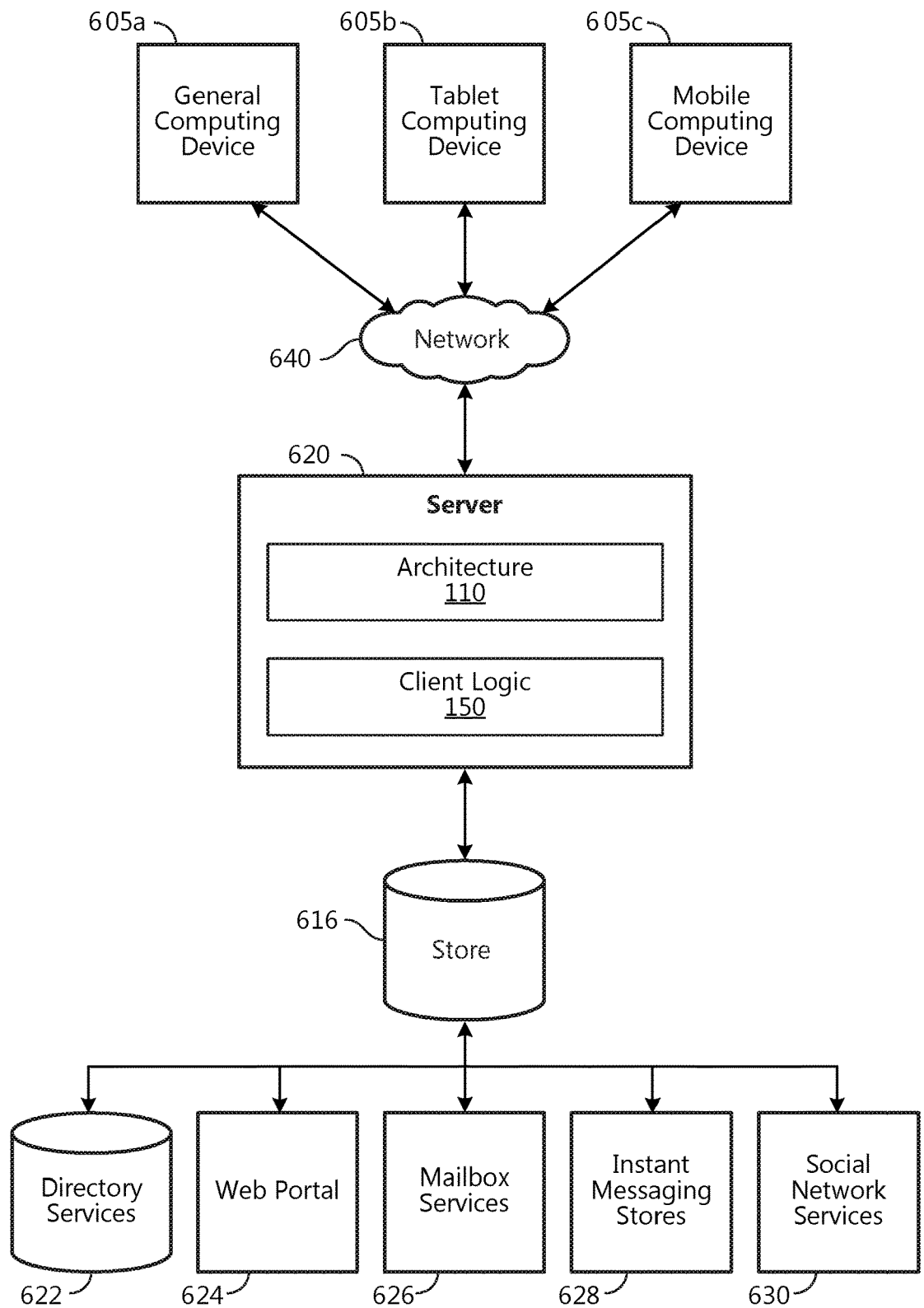
FIG. 6 is a block diagram of a distributed computing system in which aspects may be practiced.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the architecture 110 and the client logic 150, operable to enable a software application 450 to employ the teachings of the present disclosure via stored instructions. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., the architecture 110 and the client logic 150) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates a peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the architecture 110 and the client logic 150 are loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated, such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for automatic presentation of blocks of repeated content as described above. Content developed, interacted with, or edited in association with the architecture 110 and the client logic 150 are enabled to be stored in different communication channels or other storage types. For example, various documents may be stored using a directory service 622, a web portal 624, a mailbox service 626, an instant messaging store 628, or a social networking site 630. The architecture 110 and the client logic 150 are operative to use any of these types of systems or the like for distribution of selected content, as described herein. According to an aspect, a server 620 provides the architecture 110 and the client logic 150 to clients 605a-c (generally clients 605), which may be run on sender devices, receiver devices, or cloud servers. As one example, the server 620 is a web server providing the architecture 110 and the client logic 150 over the web. The server 620 provides the architecture 110 and the client logic 150 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

I claim:

1. A method for handling user commands from multiple operating system platforms at an architecture via an extensible environment, comprising:
   recognizing a first gesture by:
      receiving, at the architecture, a first raw pointer input from a first device operating on a first operating system platform;
      determining, at the architecture, a first object displayed in a first user interface of the first device that is associated with the first raw pointer input based on a position of the first raw pointer input in the first user interface;
      identifying, at the architecture, a first set of gestures corresponding to the first operating system platform, the first set of gestures including a number and type of gestures based on expected pointer inputs capable of being performed on the first operating system platform; and
      recognizing, at the architecture, the first gesture from the first set of gestures based on the first raw pointer input, a pointer status, and locations of the first raw pointer input relative to the first object;
   recognizing, at the architecture, a second gesture based on a received second raw pointer input associated with a second object displayed in a second user interface of a second device operating on a second operating system platform, the second gesture recognized from a second set of gestures corresponding to the second operating system platform, the second set of gestures including a number and type of gestures identified based on expected pointer inputs capable of being performed on the second operating system platform, wherein the second gesture is a different type of gesture from the first gesture and the second operating system platform is a different operating system platform than the first operating system platform;
   normalizing, at the architecture, the first raw pointer input and the second raw pointer input when determining the first gesture and the second gesture signify execution of a same command;
   determining, at the architecture, the same command to be executed on the first device and the second device, the same command being determined based on a respective object and a respective gesture; and
   transmitting the same command for execution on the first device and the second device when the first raw pointer input received from the first device is different from the second raw pointer input received from the second device.

2. The method of claim 1, wherein the first object associated with the first raw pointer input includes multiple sub-objects.

3. The method of claim 1, wherein the position of the first raw pointer input in the first user interface does not match a position of the first object and the first object is determined to be associated with the first raw pointer input as an object closest to the position of the first raw pointer input in the first user interface.

4. The method of claim 1, wherein the first object is replaced in response to recognizing the first gesture signifies execution of a different command.

5. The method of claim 1, wherein determining the same command is further based on knowing an operating system of the first device and the second device.

6. The method of claim 1, wherein transmitting the same command for execution on the first device and the second device comprises updating the first user interface and the second user interface to display the same command at a top z-order relative to the first object and the second object while maintaining a layout of the first user interface and the second user interface.

7. The method of claim 1, wherein determining the same command is further based on a user interface mode.

8. The method of claim 1, wherein the first object is a canvas of the first user interface.

9. The method of claim 1, wherein the same command is composited with a second command in a command stack for transmission to the first device and the second device to execute the same command and the second command.

10. The method of claim 1, wherein the pointer status is chosen from:
   a mouse click;
   a mouse double-click;
   a continuous mouse depression;
   pen gestures;
   eye tracking gestures;
   hover gestures;
   touch pad gestures;
   a tap touch input;
   a double-tap touch input;
   a continuous touch input; and
   a multi-touch touch input.

11. A system having an architecture for handling user commands from multiple operating system platforms via an extensible environment, the architecture comprising:
   a processing unit; and
   a system memory communicatively coupled to the processing unit, wherein the system memory includes instructions, that when executed by the processing unit, cause the processing unit to:
      recognize a first gesture by:
         receiving a first raw pointer input associated with a first object displayed in a first user interface from a first device operating on a first operating system platform, wherein the first raw pointer input indicates a pointer status and a location of the first raw pointer input relative to the first object in the first user interface;
         identifying a first set of gestures corresponding to the first operating system platform, the first set of gestures including a number and type of gestures based on expected pointer inputs capable of being performed on the first operating system platform; and
         recognizing the first gesture from the first set of gestures based on the first raw pointer input, the pointer status, and the location of the first raw pointer input relative to the first object;
      recognize a second gesture based on a received second raw pointer input associated with a second object displayed in a second user interface from a second device operating on a second operating system platform, the second gesture recognized from a second set of gestures corresponding to the second operating system platform, the second set of gestures including a number and type of gestures identified based on expected pointer inputs capable of being performed on the second operating system platform, wherein the second gesture is a different type of gesture from the first gesture and the second operating system platform is a different operating system platform than the first operating system platform;
      normalize the first raw pointer input and the second raw pointer input when determining the first gesture and the second gesture signify execution of a same command;
      determine the same command to be executed on the first device and the second device, the same command being determined based on a respective object and a respective gesture; and
      transmit the same command for execution on the first device and the second device when the first raw pointer input received from the first device is different from the second raw pointer input received from the second device.

12. The system of claim 11, wherein components of the architecture are tailored in size and composition to a client logic providing the first user interface and the second user interface at the first device and the second device.

13. The system of claim 11, further comprising:
   an object application program interface in communication with the system, wherein the object application program interface provides on-object user interface elements related to the same command that is executed.

14. A method for handling user commands from multiple operating system platforms at an architecture via an extensible environment, comprising:
   recognizing a first gesture by:
      receiving, at the architecture, from a first device operating on a first operating system platform, a first raw pointer input associated with a first object displayed in a first user interface and hit test results, wherein the hit test results identify the first object displayed in the first user interface;
      identifying, at the architecture, a first set of gestures corresponding to the first operating system platform, the first set of gestures including a number and type of gestures based on expected pointer inputs capable of being performed on the first operating system platform; and
      recognizing, at the architecture, the first gesture from the first set of gestures based on the first raw pointer input and the hit test results;
   recognizing, at the architecture, a second gesture based on a received second raw pointer input associated with a second object displayed in a second user interface of a second device operating on a second operating system platform, the second gesture recognized from a second set of gestures corresponding to the second operating system platform, the second set of gestures including a number and type of gestures identified based on expected pointer inputs capable of being performed on the second operating system platform, wherein the second gesture is a different type of gesture from the first gesture and the second operating system platform is a different operating system platform than the first operating system platform;
   normalizing, at the architecture, the first raw pointer input and the second raw pointer input when determining the first gesture and the second gesture signify execution of a same command;
   determining, at the architecture, the same command to be executed on the first device and the second device, the same command being determined based on a respective gesture to perform on a respective object; and
   transmitting the same command to a command stack for execution on the first device and the second device when the first raw pointer input received from the first device is different from the second raw pointer input received from the second device.

15. The method of claim 14, wherein in cases that the hit test results identify multiple objects displayed in the first user interface, the same command is directed to a given object of the multiple objects based on the first gesture being associated with the given object.

16. The method of claim 14, wherein more than one command related to the respective object is transmitted to the command stack.

17. The method of claim 16, further comprising:
receiving an undo command from one or more of the first device and the second device; and
reverting one or more of the first user interface and the second user interface to a state prior to executing the same command.

18. The method of claim 14, wherein the same command executed at the first device and the second device overrides a command performed by the architecture of the extensible environment on the respective object.

* * * * *